United States Patent
Puc et al.

(10) Patent No.: US 6,825,973 B1
(45) Date of Patent: Nov. 30, 2004

(54) REDUCING LEADING EDGE TRANSIENTS USING CO-PROPAGATING PUMPS

(75) Inventors: Andrej B. Puc, Allen, TX (US); Michel W. Chbat, Allen, TX (US); Jason D. Henrie, McKinney, TX (US); Sergey P. Burtsev, Allen, TX (US); Frederic L. Barthelemy, Allen, TX (US); Ned A. Weaver, Garland, TX (US)

(73) Assignee: Xtera Communications, Inc., Allen, TX (US)

( * ) Notice: Subject to any disclaimer, the term of this patent is extended or adjusted under 35 U.S.C. 154(b) by 424 days.

(21) Appl. No.: 10/100,617

(22) Filed: Mar. 15, 2002

(51) Int. Cl.$^7$ ................................................. H01S 3/00
(52) U.S. Cl. ....................................................... 359/334
(58) Field of Search .......................... 359/334; 398/24; 385/100

(56) References Cited

U.S. PATENT DOCUMENTS

| | | | |
|---|---|---|---|
| 4,700,339 A | 10/1987 | Gordon et al. | 370/3 |
| 4,740,974 A | 4/1988 | Byron | 372/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,058,974 A | 10/1991 | Mollenauer | 385/27 |
| 5,060,302 A | 10/1991 | Grimes | 359/135 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,140,456 A | 8/1992 | Huber | 359/341 |
| 5,191,628 A | 3/1993 | Byron | 385/27 |
| 5,224,194 A | 6/1993 | Islam | 385/122 |
| 5,225,922 A | 7/1993 | Chraplyvy et al. | 359/124 |
| 5,293,545 A | 3/1994 | Huber | 359/111 |

(List continued on next page.)

FOREIGN PATENT DOCUMENTS

| | | | |
|---|---|---|---|
| EP | 0 421 675 A2 | 4/1991 | H04B/10/16 |
| EP | 0 829 980 A2 | 3/1998 | H04J/14/02 |
| EP | 0 845 840 A2 | 6/1998 | H01S/3/06 |
| EP | 0 959 578 A2 | 11/1999 | H04J/14/02 |
| JP | 0 9 197452 A | 7/1997 | G02F/1/35 |
| WO | 98/42088 | 9/1998 | H04B/10/17 |
| WO | 00/49721 | 8/2000 | |

OTHER PUBLICATIONS

Perlin et al. Pulse Compression and Amplification by Stimulated Raman Scattering in a nonlinear periodic structure. CLEO 2000. May 9, 2000. Pp. 151–152.*

Kuzmich et al. Signal Velocity, Causality, and quantum Noise in Superlinimal PUlse Propagation. Physical Review Letters. Vol. 86, No. 18.. Apr. 30, 2001. Pp. 3925–3928.*

(List continued on next page.)

*Primary Examiner*—Nelson Moskowitz
*Assistant Examiner*—Deandra M. Hughes
(74) *Attorney, Agent, or Firm*—Baker Botts L.L.P.

(57) ABSTRACT

An optical amplifier includes at least one amplification stage having a saturation recovery time of less than one (1) millisecond. The amplification stage includes a gain medium operable to receive at least one pump signal and to receive from a multiple span communication link an optical signal comprising a leading edge. The at least one pump signal and the optical signal travel in the same direction at approximately the same speed through at least a portion of the gain medium. In one particular embodiment the leading edge of the optical signal after passing through a plurality of amplifiers when received by a receiver coupled to the communication link comprises a peak power that is no more than ten times the average power of the optical signal at the receiver.

101 Claims, 3 Drawing Sheets

U.S. PATENT DOCUMENTS

| | | | |
|---|---|---|---|
| 5,343,322 A | 8/1994 | Pirio et al. | 359/173 |
| 5,369,519 A | 11/1994 | Islam | 359/173 |
| 5,485,536 A | 1/1996 | Islam | 385/31 |
| 5,506,723 A | 4/1996 | Junginger | 359/341 |
| 5,542,011 A | 7/1996 | Robinson | 385/24 |
| 5,557,442 A | 9/1996 | Huber | 359/179 |
| 5,623,508 A | 4/1997 | Grubb et al. | 372/3 |
| 5,664,036 A | 9/1997 | Islam | 385/31 |
| 5,673,280 A | 9/1997 | Grubb et al. | 372/3 |
| 5,778,014 A | 7/1998 | Islam | 372/6 |
| 5,790,289 A | 8/1998 | Taga et al. | 359/124 |
| 5,796,909 A | 8/1998 | Islam | 385/147 |
| 5,801,860 A | 9/1998 | Yoneyama | 359/124 |
| 5,852,510 A | 12/1998 | Meli et al. | 359/341 |
| 5,959,766 A | 9/1999 | Otterbach et al. | 359/337 |
| 5,995,275 A | 11/1999 | Sugaya | 359/341 |
| 6,008,933 A | 12/1999 | Grubb et al. | 359/341 |
| 6,040,933 A | 3/2000 | Khaleghi et al. | 359/124 |
| 6,043,927 A | 3/2000 | Islam | 359/332 |
| 6,052,393 A | 4/2000 | Islam | 372/6 |
| 6,064,501 A * | 5/2000 | Roberts et al. | 398/11 |
| 6,067,177 A | 5/2000 | Kanazawa | 359/124 |
| 6,101,024 A | 8/2000 | Islam et al. | 359/334 |
| 6,104,848 A | 8/2000 | Toyohara et al. | 385/24 |
| 6,115,157 A | 9/2000 | Barnard et al. | 359/124 |
| 6,134,034 A | 10/2000 | Terahara | 359/124 |
| 6,185,022 B1 | 2/2001 | Harasawa | 359/124 |
| 6,219,162 B1 | 4/2001 | Barnard et al. | 359/124 |
| 6,229,937 B1 | 5/2001 | Nolan et al. | 385/24 |
| 6,236,488 B1 | 5/2001 | Shimizu et al. | 359/187 |
| 6,236,498 B1 | 5/2001 | Freeman et al. | 359/341 |
| 6,239,902 B1 | 5/2001 | Islam et al. | 359/334 |
| 6,239,903 B1 | 5/2001 | Islam et al. | 359/337 |
| 6,271,945 B1 | 8/2001 | Terahara | 359/124 |
| 6,335,820 B1 | 1/2002 | Islam | 359/334 |
| 6,341,034 B1 * | 1/2002 | Sun et al. | 359/341.41 |
| 6,342,959 B1 * | 1/2002 | Haxell et al. | 398/79 |
| 6,356,383 B1 | 3/2002 | Cornwell, Jr. et al. | 359/334 |
| 6,356,384 B1 | 3/2002 | Islam | 359/334 |
| 6,356,386 B1 * | 3/2002 | Denkin et al. | 359/337 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,396,625 B1 | 5/2002 | Nakaji | 359/341.41 |
| 6,404,523 B1 | 6/2002 | Morikawa et al. | 359/124 |
| 2002/0021861 A1 | 2/2002 | Gnauck et al. | 385/24 |
| 2002/0048062 A1 | 4/2002 | Sakamoto et al. | 359/124 |
| 2002/0060821 A1 | 5/2002 | Manna et al. | 359/124 |

OTHER PUBLICATIONS

Hollenbeck et al. Pump Depletion in Bidirectional Raman Amplification. The University of Texas at Dallas. Oct. 2001.*

Mollenauer et al., "Soliton Propagation in Long Fibers with Periodically Compensated Loss," IEEE Journal of Quantum Electronics, vol. QE–22, No. 1, pp. 157–173, Jan. 1986.

Edgawa et al., "Amplification Characteristics of Fiber Raman Amplifiers," OQE 88 25~36, vol. 88, No. 87, pp. 1–18 pluse 9 pages, Jun. 20, 1988.

Chraplyvy et al., "Equalization in Amplified WDM Lightwave Transmission Systems," IEEE Photonics Technology Letters, vol. 4, No. 8, pp. 920–922, Aug. 1992.

Hansen et al., "Repeaterless transmission experiment employing dispersion," 21st European Conference on Optical Communication, vol. 2, 1 page, Sep. 17–21, 1995.

White et al.; "Optical Fiber Components and Devices," Optical Fiber Telecommunications, Ch. 7, pp. 267–319, 1997.

Tonguz et al., "Gain Equalization of EDFA Cascades," Journal of Lightwave Technology, vol. 15, No. 10, pp. 1832–1841, Oct. 1997.

Hansen et al.; "Loss compensation in dispersion compensating fiber modules by Raman amplification," Optical Fiber Conference OFC'98, Technical Digest TuD1, pp. 20–21, Feb. 1998.

Lee et al., "Bidirectional transmission of 40 Gbit/s WDM Signal over 100km dispersion shifted fibre," Electronics Letters, vol. 34, No. 3, pp. 294–295, Feb. 5, 1998.

Dianov et al., "Highly efficient 1.3$\mu$m Raman fibre amplifier," Electronics Letters, vol. 34, No. 7, Apr. 2, 1998.

Forghieri, et al., "Simple Model of Optical Amplifier Chains to Evaluate Penalties in WDM Systems," Journal of Lightwave Technology, vol. 16, No. 9, pp. 1570–1576, Sep. 1998.

Letellier et al., "Access to Transmission Performance Margins Through Pre–emphasis Adjustment in WDM Systems," ECOC, pp. 275–276, Sep. 20–24, 1998.

Nissov et al, "Rayleigh crosstalk in long cascades of distributed unsaturated Raman amplifiers," Electronics Letters Online No. 19990672, 2 pages, Apr. 7, 1999.

Tancevski et al., "Output Power and SNR Swings in cascades of EDFA's for Circuit– and Packet–Switched Optical Networks," Journal of Lightwave Technology, vol. 17, No. 5, pp. 733–742, May 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Suzuki et al., "50 GHz spaced, 32×10, Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Rottwitt et al., "Transparent 80 km Bi–Directionally Pumped Distributed Raman Amplifier with Second Order Pumping," ECOC, vol. 11, pp. 144–145, Sep. 26–30, 1999.

Manna et al., "Modeling of Penalties on Chains of Optical Amplifiers with Equalizing Filters," Journal of Lightwave Technology, vol. 18, No. 3, pp. 295–300, Mar. 2000.

Fludger et al., "Fundamental Noise Limits in Broadband Raman Amplifiers," OFC, pp. MA5/1–MAS/3, 2001.

Chen et al., "Transient effects in saturated Raman amplifiers," Electronics Letters, vol. 37, No. 6, 2 pgs., Mar. 15, 2001.

Optical Society of America, Optical Amplifiers and Their Applications, Technical Digest, entitled "Raman amplification and dispersion–managed solitons for all–optical, ultra–long–haul, dense WDM." Jul. 1–4, 2001.

Fludger et al., "Pump to Signal RIN Transfer in Raman Fiber Amplifiers," Journal of Lightwave Technology, vol. 19, No. 8, pp. 1140–1148, Aug. 2001.

Menif et al., "Application of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Chen et al., "Control of transient effects in distributed and lumped Raman amplifiers," Electronics Letters, vol. 37, No. 21, 2 pgs., Oct. 11, 2001.

Murakami et al., "WDM Upgrading of an Installed Submarine Optical Amplifier System," Journal of Lightwave Technology, vol. 19, No. 11, pp. 1665–1674, Nov. 2001.

Espindola et al., "Penalty–free 10 Gbit/s single–channel co–pumped distributed Raman amplification using low RIN 14xx nm DFB pump," Electronics Letters, vol. 38, No. 3, 2 pages, Jan. 31, 2002.

Emori et al., "Less than 4.7 dB Noise Figure Broadband In–line EDFA with A Raman Amplified–1300 ps/nm DCF Pumped by Multi–channel WDM Laser Diodes," paper PD3–1–5, no date available.

Scheerer et al., "SRS crosstalk in preemphasized WDM Systems," pp. WM28–1/293–WM28–3/295, no date available.

Pending Patent Application: WO 99/66607; entitled "Dispersion Compensating and Amplifying Optical Element, Method for Minimizing Gain Tilt, and Apparatus for Minimizing Non–Linear Interaction between Band Pumps," by Mohammed N. Islam et al., filed Jun. 16, 1999.

Pending Patent Application; USSN 09/760,201; entitled "Low–Noise Distributed Raman Amplifier Using Bi–Directional Pumping Using Multiple Raman Orders," by Mohammed N. Islam, et al., filed Jan. 12, 2001.

Pending Patent Application; USSN 10/014,839; entitled "Multi–Stage Optical Amplifier and Broadband Communication System," by Mohammed N. Islam, filed Dec. 10, 2001.

Pending Patent Application; USSN 10/211,103; entitled "Co–Propagating Raman Amplifiers," by Mohammed N. Islam et al., filed Aug. 2, 2002.

* cited by examiner

REDUCING LEADING EDGE TRANSIENTS USING CO-PROPAGATING PUMPS

TECHNICAL FIELD OF THE INVENTION

The present invention relates generally to communication systems, and more particularly to a system and method for reducing leading edge transients in optical signals by using at least one co-propagating pump signal in an optical amplifier receiving the optical signal.

OVERVIEW

To reduce noise transfer from a pump signal to an optical signal being amplifier, amplifiers used in optical communication systems typically attempt to minimize the amount of time a pump signal interacts with the optical signal traversing the gain medium of the amplifier. As a result, most optical amplifiers implement only pump signals that propagate counter to the direction of propagation of the optical signal. Communication systems implementing exclusively counter-propagating pump signals tend to create a leading edge transient within the optical signal. This leading edge transient typically results in a power spike at the leading edge of the optical signal. Once created, this power spike continues to increase in magnitude as the optical signal passes through additional amplifiers and/or amplification stages. The magnitude of these power spikes can be sufficiently large to cause transmission errors and in some cases cause damage to the receivers of the optical communication system.

SUMMARY OF EXAMPLE EMBODIMENTS

The present invention recognizes a need for a system and method for reducing leading edge transients in optical signals using at least one co-propagating pump signal in an optical amplifier. In accordance with the present invention, an apparatus and method for reducing leading edge transients in optical signals is provided that reduce or eliminate at least some of the shortcomings associated with prior approaches.

In one embodiment, an optical amplifier comprises at least one amplification stage having a saturation recovery time of less than one millisecond. The amplification stage comprises a gain medium operable to receive at least one pump signal and to receive from a multiple span communication link an optical signal comprising a leading edge. The at least one pump signal and the optical signal travel in the same direction at approximately the same speed through at least a portion of the gain medium. In one particular embodiment, the leading edge of the optical signal after passing through a plurality of amplifiers when received by a receiver coupled to the communication link comprises a peak power that is no more than ten (10) times the average power of the optical signal at the receiver.

In another embodiment, an optical amplifier operable to be coupled to a multiple span communication link, the amplifier comprises a gain medium operable to receive at least one pump signal and an optical signal comprising a leading edge. The at least one pump signal and the optical signal interact while traveling through at least a portion of the gain medium in the same direction. In one particular embodiment, the leading edge of the optical signal when received by a receiver coupled to an end of the communication link comprises a peak power that is no more than ten times the average power of the optical signal received. This condition holds even where a saturation recovery time of the amplifier is less than a time period between the leading edge of the optical signal received by the amplifier and a trailing edge of an optical signal received just prior to the optical signal.

In yet another embodiment, an optical amplifier comprises at least one amplification stage. The amplification stage comprises a gain medium comprising at least length of two hundred (200) meters. The amplification stage is operable to receive at least one pump signal and to receive from a multiple span communication link an optical signal comprising a leading edge. The at least one pump signal and the optical signal travel in the same direction at approximately the same speed through at least a portion of the gain medium. In one particular embodiment, the amplification stage comprises a Raman amplification stage. In that embodiment, the at least one pump signal goes from a non-saturated operating state to an at least partially saturated operating state while the leading edge traverses the amplification stage to reduce an overshoot in gain imparted to the leading edge.

In still another embodiment, an optical amplifier comprises at least one amplification stage. The amplification stage comprises a gain medium operable to receive at least one pump signal and to receive from a multiple span communication link an optical signal comprising a leading edge. The at least one pump signal and the optical signal travel in the same direction at approximately the same speed through at least a portion of the gain medium. The amplification stage comprises a Raman amplification stage. In one particular embodiment, the leading edge of the optical signal substantially overlaps with a portion of the pump signal through at least a majority of the gain medium to reduce an overshoot in gain imparted to the leading edge by the at least one pump signal.

In a method embodiment, a method of amplifying an optical signal in a multiple span communication link comprises receiving an optical signal at a gain medium of the amplification stage having a saturation recovery time of less than one millisecond. The optical signal comprising a leading edge. The method also includes, introducing at least one pump signal to the gain medium to interact with the optical signal. The optical signal and at least a portion of the at least one pump signal travel in the same direction and at approximately the same speed through at least a portion of the gain medium. In one particular embodiment, the leading edge of the optical signal when received by a receiver coupled to the communication link after passing through a plurality of amplifiers comprises a peak power that is no more than ten (10) times the average power of the optical signal at the receiver.

In another embodiment, a method of amplifying an optical signal in a multiple span communication link comprises receiving at a gain medium of an optical amplification stage an optical signal comprising a leading edge. The method also comprises receiving at a gain medium of an optical amplification stage an optical signal comprising a leading edge. The method further comprises introducing at least one pump signal to the gain medium to interact with the optical signal. The optical signal and at least a portion of the at least one pump signal travel through at least a portion of the gain medium in the same direction. In one particular embodiment, the leading edge of the optical signal when received by a receiver coupled to an end of the communication link comprises a peak power that is no more than ten times the average power of the optical signal received. This condition holds even where a saturation recovery time of the amplifier is less than a time period between the leading edge of the optical signal received by the amplifier and a trailing edge of an optical signal received just prior to the optical signal.

In yet another method embodiment, a method of amplifying an optical signal in a multiple span communication link comprises receiving at a gain medium of an optical amplification stage an optical signal comprising a leading edge. The method also comprises introducing at least one pump signal to the gain medium to interact with the optical signal. The gain medium comprises a length of two hundred (200) meters. The optical signal and at least a portion of the at least one pump signal travel through at least a portion of the gain medium in the same direction. The amplification stage comprises a Raman amplification stage. In one particular embodiment, the at least one pump signal goes from a non-saturated operating state to an at least partially saturated operating state while the leading edge traverses the amplification stage to reduce an overshoot in gain imparted to the leading edge of the optical signal.

Depending on the specific features implemented, particular embodiments may exhibit some, none, or all of the following technical advantages. Various embodiments reduce leading edge transients in optical signals being communicated. This can help prevent the formation of transmission errors and protect receivers from being damaged by large transient power spikes. These techniques can be particularly useful, for example, during a signal turn-on period or where the amplifier sees bursty traffic patterns. Other embodiments enable the use of a co-propagating pump signal that travels at approximately the same speed as the optical signal, while maintaining an acceptable optical noise figure.

Unlike optical systems that rely exclusively on feedback control to deal with leading edge transients, various embodiments described herein substantially reduce the formation of even the initial power spike. Unlike optical systems reduce leading edge transients solely by regulating speed of the turn-up of signal power, various embodiments described herein allow for immediate signal power turn-up. Moreover, the embodiments described herein can accommodate bursty traffic patterns that can present problems for systems relying solely on regulation of signal turn-up power.

If desired, embodiments described herein can be combined with other transient signal control methods, such as using feedback control to regulate pump powers, or regulating signal turn on speeds.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
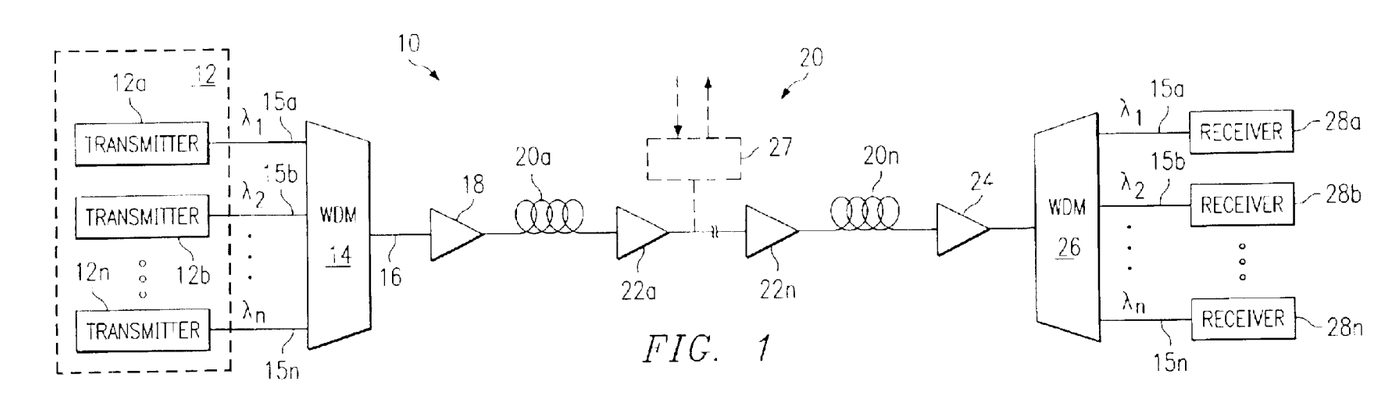
FIG. 1 is a block diagram showing at least a portion of an exemplary optical communication system 10 operable to facilitate communication of one or more multiple wavelength signals.

FIG. 1 is a block diagram showing at least a portion of an exemplary optical communication system 10 operable to facilitate communication of one or more multiple wavelength signals 16. Each multiple wavelength signal 16 comprises a plurality of optical wavelength signals (or channels) 15a–15n, each comprising a center wavelength of light. In some embodiments, each optical signal 15a–15n can comprise a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength.

In this example, system 10 includes a transmitter assembly 12 operable to generate the plurality of optical signals (or channels) 15a–15n. Transmitters 12 can comprise any devices capable of generating one or more optical signals. Transmitters 12 can comprise externally modulated light sources, or can comprise directly modulated light sources.

In one embodiment, transmitter assembly 12 comprises a plurality of independent pairs of optical sources and associated modulators, each pair being operable to generate one or more wavelength signals 15. Alternatively, transmitter assembly 12 could comprise one or more optical sources shared by a plurality of modulators. For example, transmitter assembly 12 could comprise a continuum source transmitter including a mode-locked source operable to generate a series of optical pulses and a continuum generator operable to receive a train of pulses from the mode-locked source and to spectrally broaden the pulses to form an approximate spectral continuum of optical signals. In that embodiment, a signal splitter receives the continuum and separates the continuum into individual signals each having a center wavelength. In some embodiments, transmitter assembly 12 can also include a pulse rate multiplexer, such as a time division multiplexer, operable to multiplex pulses received from the mode locked source or the modulator to increase the bit rate of the system.

Transmitter assembly 12 may, in some cases, comprise a portion of an optical regenerator. That is, transmitter assembly 12 may generate optical signals 15 based on electrical representations of electrical or optical signals received from other optical communication links. In other cases, transmitter assembly 12 may generate optical signals 15 based on information received from sources residing locally to transmitters 12. Transmitter assembly 12 could also comprise a portion of a transponder assembly (not explicitly shown), containing a plurality of transmitters and a plurality of receivers.

In the illustrated embodiment, system 10 also includes a combiner 14 operable to receive wavelength signals 15a–15n and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

In this example, system 10 includes one or more booster amplifiers 18 operable to receive and amplify wavelengths of signal 16 in preparation for transmission over a communication medium 20.

System 10 communicates multiple wavelength signal 16 over an optical communication medium 20. Communication medium 20 can comprise a plurality of spans 20a–20n of fiber. Fiber spans 20a–20n could comprise standard single mode fiber (SMF), dispersion-shifted fiber (DSF), non-zero dispersion-shifted fiber (NZDSF), dispersion compensating fiber (DCF), or another fiber type or combination of fiber types. In various embodiments, communication medium 20 can comprise up to five (5), seven (7), ten (10) fiber spans, fifteen (15) fiber spans, twenty (20) fiber spans, or more.

Two or more spans of communication medium 20 can collectively form an optical link. In the illustrated example, communication medium 20 includes a single optical link 25 comprising numerous spans 20a–20n. System 10 could include any number of additional links coupled to link 25. For example, optical link 25 could comprise one optical link of a multiple link system, where each link is coupled to other links through, for example, optical regenerators.

Optical communication link 25 could comprise, for example, a unidirectional link, or a bi-directional link. Link 25 could comprise a point-to-point communication link, or could comprise a portion of a larger communication network, such as a ring network, a mesh network, a star network, or any other network configuration.

Where communication system 10 includes a plurality of fiber spans 20a–20n, system 10 can also include one or more in-line amplifiers 22a–22n. In-line amplifiers 22 couple to one or more spans 20a–20n and operate to amplify signal 16 as it traverses communication medium 20. Optical communication system 10 can also include one or more preamplifiers 24 operable to amplify signal 16 received from a final fiber span 20n. Amplifiers 18, 22, and 24 could each comprise, for example, one or more stages of discrete Raman amplifiers, distributed Raman amplifiers, rare earth doped amplifiers, such as an erbium doped or thulium doped amplifier, semiconductor amplifiers or a combination of these or other amplifier types.

Throughout this document, the term "amplifier" denotes a device or combination of devices operable to at least partially compensate for at least some of the losses incurred by signals while traversing all or a portion of optical link 25. Likewise, the terms "amplify" and "amplification" refer to offsetting at least a portion of losses that would otherwise be incurred.

An amplifier may, or may not impart a net gain to a signal being amplified. Moreover, the terms "gain" and "amplify" as used throughout this document, does not (unless explicitly specified) require a net gain. In other words, it is not necessary that a signal experiencing "gain" or "amplification" in an amplifier stage experience enough gain to overcome all losses in the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission fiber.

Although optical link 25 is shown to include one or more booster amplifiers 18 and preamplifiers 24, one or more of the amplifier types could be eliminated in other embodiments.

In some cases, multiple wavelength signal 16 can carry wavelength signals 15a–15n ranging across a relatively wide bandwidth. In some implementations, wavelength signals 15a–15n may even range across different communications bands (e.g., the short band (S-band), the conventional band (C-band), and/or the long band (L-band)). Depending on the amplifier types chosen, one or more of amplifiers 18, 22, and/or 24 could comprise a wide band amplifier operable to amplify all signal wavelengths 15a–15n received.

Alternatively, one or more of those amplifiers could comprise a parallel combination of narrower band amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of wavelength groups of wavelengths prior to combining or recombining the wavelengths for communication through system 10.

System 10 may further include one or more access elements 27. For example, access element 27 could comprise an add/drop multiplexer, a cross-connect, or another device operable to terminate, cross-connect, switch, route, process, and/or provide access to and from optical link 25 and another optical link or communication device. System 10 may also include one or more lossy elements (not explicitly shown) coupled between spans 20 of link 25. For example, the lossy element could comprise a signal separator, a signal combiner, an isolator, a dispersion compensating element, or a gain equalizer.

In this example, system 10 includes a separator 26 operable to separate individual optical signal 15a–15n from multiple wavelength signal 16 received at the end of link 25. Separator 26 can communicate individual signal wavelengths or ranges of wavelengths to a bank of receivers 28 and/or other optical communication paths. Separator 26 may comprise, for example, a wavelength division demultiplexer (WDM).

One aspect of this disclosure recognizes that a substantial reduction in the "leading edge transient" can be achieved by approximately using at least one co-propagating pump signal. In some cases, the optical signal and at least a portion of the pump signal being co-propagated can be made to travel at approximately the same speed. Conventional design approaches may not have recognized this technique as advantageous, because allowing co-propagating pumps signals to travel at the same speed as the optical signal generally tends to, increase the duration of pump signal interaction and increases pump noise within the signal. To the extent that any system has implemented any co-propagating pump signals, these systems have typically sought to minimize the duration of pump signal interaction. These systems have minimized the duration of pump signal interaction by using pump signals that travel at a substantially different speed than the optical signal. This disclosure further recognizes that implementing an amplifier with a gain fiber that is sufficiently dispersive and has a relatively low relative intensity noise (RIN) can minimize the amount of pump noise transferred to the optical signal.

One way to determine relative speeds of optical signals is to measure an amount of slip between a point on the leading edge of the optical signal and a point on the pump signal. The optical slip associated with the leading edge of the optical signal refers to the amount the leading edge slips in relation to the pump signal. The optical slip can be determined mathematically as a product of the magnitude of dispersion (D) associated with the gain fiber, the effective length of the gain fiber ($L_{eff}$), and the difference ($\Delta\lambda$) between the optical signal wavelength and the pump signal wavelength. The value of the optical slip can be expressed in pico-seconds. Detrimental effects resulting from optical slip can be particularly acute in optical fibers having a positive slope of dispersion.

In equation form, this relationship is expressed as:

$$\Delta\tau = D \times L_{eff} \times \Delta\lambda.$$

For example, in system where the effective length is twenty (20) kilometers and the wavelength separation is one hundred (100) nanometers, the amount of slip can vary depending on the dispersivity of the fiber. Using this example configuration, fibers having dispersivities ranging from, for example, ten (10) to one hundred (100) picoseconds per nanometer-kilometer can result in slip durations ranging from twenty (20) nanoseconds to two hundred (200) nanoseconds. Obviously, the effective length of the fiber and/or the wavelength separation could also be manipulated to result in various slip durations. These particular slip durations are intended for exemplary purposes.

At least some of amplifiers 18, 22, and 24 can comprise gain medium driven by one or more counter-propagating optical pump signals (e.g., pump signals that propagate through the gain medium in a direction counter to the direction of signal 16). Exclusively using counter-propagating pump signals in the amplifiers of an optical communication system, while typically seen as an advantage in reducing the pump noise associated with an optical signal, tends to create a leading edge transient. Throughout this document, the term "leading edge" refers to the portion of the optical signal being amplified that is first to substantially interact with the pump signal. The term "edge" merely refers to the beginning of the optical signal and does not require any particular signal geometry. Typically, a leading edge transient will occur upon activation of an amplifier within the system. The leading edge transient can also occur when the optical signals comprise packets or other bursty traffic types and where the time between at least some of the sequentially received packets is greater than the time it takes the amplifier to go from a partially or fully saturated state to a non-saturated or linear state.

The leading edge transient typically results in a power spike at the leading edge of the optical signal. Once created, the power spike at the leading edge continues to increase in magnitude as the optical signal passes through other amplification stages within the system. As the peak power increases, it tends to degrade the optical noise figure of the optical signal. A receiver within the optical communication system eventually receives this power spike. In some cases, the transient spike can damage the receiver.

At least one amplifier in system 10 comprises an amplification stage intended to operate in an at least partially saturated state at least part of the time. The amplifier has a relatively rapid response time from the saturation condition to a linear operation condition. Throughout this document, the phrase "rapid response time" refers to an amplifier stage capable of moving from a saturation operation condition to a non-saturated or linear operation in a shorter time than the off time of the amplifier or a shorter time than the spacing between at least some of the bursts of packet traffic, when used. Raman amplification stages, parametric amplification stages, and semiconductor amplification stages provide just a few examples of rapidly recovering amplification stages. In various embodiments, the at least one amplifier stage can operate in an at least five percent (5%) saturated state, an at least ten percent (10%) saturated state, an at least twenty percent (20%) saturated state, or more.

In this embodiment, the rapidly recovering amplification stage operating in at least partial saturation implements at least one co-propagating pump signal. Throughout this document, the term "co-propagating pump signal" refers to a pump signal that, for at least some time has at least a portion of the signal that propagates in the gain medium in the same direction as the optical signal being amplified. The co-propagating pump signal could comprise a pump signal that entirely co-propagates with the optical signal. In other embodiments, the co-propagating pump signal could comprise one portion of a pump signal that spends part of the time co-propagating and part of the time counter-propagating. For example, a pump signal may be introduced to the gain medium as a co-propagating or counter-propagating pump signal, and at some point be fully or partially reflected causing all or a portion of the signal to reverse its direction of travel through the gain medium.

In one embodiment, the co-propagating pump signal travels at approximately the same speed as the optical signal being amplified. In various embodiments, the peak power of the leading edge of optical signal 16 exiting optical link 25 comprises no more than ten (10) times the average power of the optical signal entering optical link 25 to reduce or avoid damaging receivers 28. In other embodiments, the peak power of the leading edge of optical signal 16 exiting optical link 25 comprises no more than five times (5) times to reduce or avoid outages of receivers 28. In still other embodiments, the peak power of the leading edge of optical signal 16 exiting optical link 25 comprises no more than two (2) times to reduce or avoid bit errors. In some embodiments, the peak power of the leading edge of optical signal 16 exiting optical link 25 comprises no more than one and one-tenth (1.1), no more than one and one-hundredth (1.01), or less.

Figure 2:
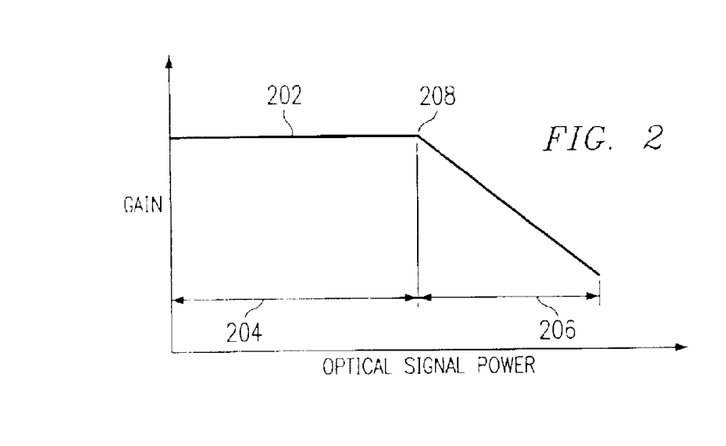
FIG. 2 is a graph showing a relationship between a gain associated with an amplifier and the power of an optical signal received by the amplifier.

FIG. 2 is a graph showing a relationship between a gain associated with an amplifier and the power of an optical signal received by the amplifier. In this example, line 202 represents the gain associated with a pump signal generated by the amplifier. Line 204 represents a non-saturated operating region of the amplifier, while line 206 represents a saturated operating region of the amplifier.

As can be seen in this figure, the optical signal being propagated on the gain medium of the amplifier will continue to accept the non-saturated amount of gain while the amplifier operates in the non-saturated region 204. The optical signal traversing the gain medium will continue to accept this amount of gain until its power reaches a saturation point 208 of the amplifier. When the signal reaches the saturation point, the amount of gain that the optical signal receives from the amplifier declines.

When using exclusively counter-propagating pumps, operating in saturation region 206 typically enables the leading edge of the optical signal to continue to increase in magnitude at the expense of at least a portion of the optical signal trailing the leading edge. In other words, when the power of the leading edge of the optical signal is large enough to cause the amplifier to operate in saturation region 206, the amount of gain available for the trailing portion of the optical signal declines. Consequently, when an amplifier implements only counter-propagating pump signals, the portion of the optical signal trailing the leading edge tends to operate at a lower optical power than the leading edge, thus causing the leading edge transient.

Figure 3:
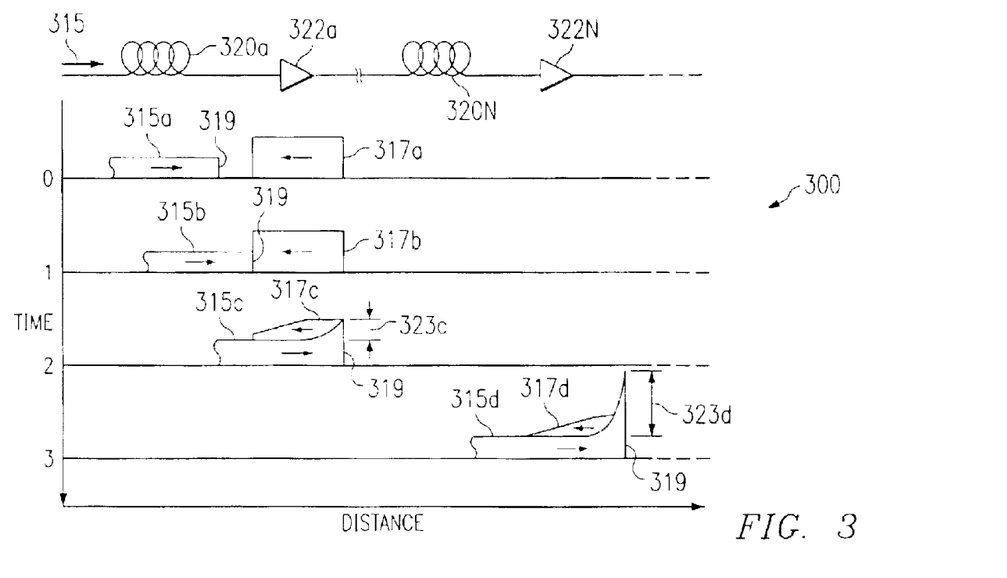
FIG. 3 is a graph showing how the use an amplifier implementing a counter-propagating pump signal can cause a leading edge transient within an optical signal traversing an optical communication system.

FIG. 3 is a graph showing how the use an amplifier implementing only a counter-propagating pump signal 317 can cause a leading edge transient 321 within an optical signal 315 traversing an optical communication system 300. In this example, communication system 300 includes at least a first amplifier 322a and a second amplifier 322n. Although this example shows two amplifiers 322a and 322n, any number of additional amplifiers could be used without departing from the scope of the present disclosure. Each amplifier 322 implements only a counter-propagating pump signal 317 and operates to amplify optical signal 315 received from a span 320 of a multiple span communication link. In this example, amplifiers 322a and 322n comprise amplifiers having a relatively rapid response time. The structure and function of each of amplifiers 322a and 322n can be substantially similar to amplifier 22 of FIG. 1.

In this example, an optical signal 315 traverses a span 320a of communications medium 320 of system 300. Signal 315a represents a packet of information traversing system 300. In other embodiments, signal 315a could represent a new optical signal introduced to system 300. In this example, line 317a represents the gain profile of pump signal 317 traversing the gain medium of amplifier 322a. At time zero, pump signal 317 comprises a non-saturated counter-propagating pump signal.

In this embodiment, line 315b represents optical signal 315 as the signal begins to interface with counter-propagating pump signal 317. Line 317b represents the gain profile of counter-propagating pump signal 317 associated with amplifier 322a before interaction with optical signal 315. A leading edge 319 of signal 315b interacts with pump signal 317 generated by amplifier 322a operating in its non-saturated region. At this point, leading edge 319 begins accepting gain from non-saturated pump signal 317. Leading edge 319 depletes pump signal 317, causing the peak power of leading edge 319 to increase. As leading edge 319 of optical signal 315b continues to traverse the gain medium of amplifier 322a, it continually interacts with a new non-saturated portion of counter-propagating pump signal 317. This interaction between leading edge 319 and a non-saturated portion of pump signal 317 results in a continual increase in the peak power of leading edge 319. At the same time, as leading edge 319 increases in power, it saturates the new portion of pump signal 317 faster and faster. This causes leading edge 319 to increase in power substantially relative to the rest of signal 315.

In this example, line 315c represents optical signal 315 after leading edge 319 has fully traversed the gain medium of amplifier 322a. In this example, line 317 represents the gain profile of pump signal 317 associated with amplifier 322a after signal 315 has fully traversed amplifier 322a. As can be seen from this figure, the power of leading edge 319 of signal 315 has increased in magnitude because of the continual interaction with new non-saturated portions of pump signal 317. Further, as leading edge 319 traversed the pump signal 317, leading edge 319 depleted each portion of pump signal 317 encountered, which resulted in the saturation of those portions of pump signal 317. The depletion of pump signal 317 caused by leading edge 319 resulted in at least a portion of the optical signal trailing leading edge 319 to experience less of a magnitude of gain than leading edge 319 experienced. This combination caused the formation of a power spike 323. The portion of power spike 323 exceeding the nominal optical signal power of optical signal 315 represents an overshoot in the amount of gain intended to be imparted to optical signal 315.

The peak power of leading edge 319 continually increases as optical signal 315 passes through a cascaded series of counter-propagating amplifiers 322. In this example, line 315d represents optical signal 315 after leading edge 319 has fully traversed the gain medium associated with amplifier 322n. In this example, line 317d represents the gain profile of pump signal 317 associated with amplifier 322n. As can be seen from this figure, the power of leading edge 319 of signal 315 has increased in magnitude because of the continual interaction with new non-saturated portions of pump signal 317 associated with amplifier 322n. Further, as leading edge 319 traversed the gain medium, leading edge 319 depleted the gain associated with pump signal 317, causing pump signal 317 to saturate in a relatively shorter period than pump signal 317 of amplifier 322a. In other words, an increase in the peak power of power spike 323, results in an increase in the rate of gain depletion associated with pump signal 317 of amplifier 322n.

Figure 4:
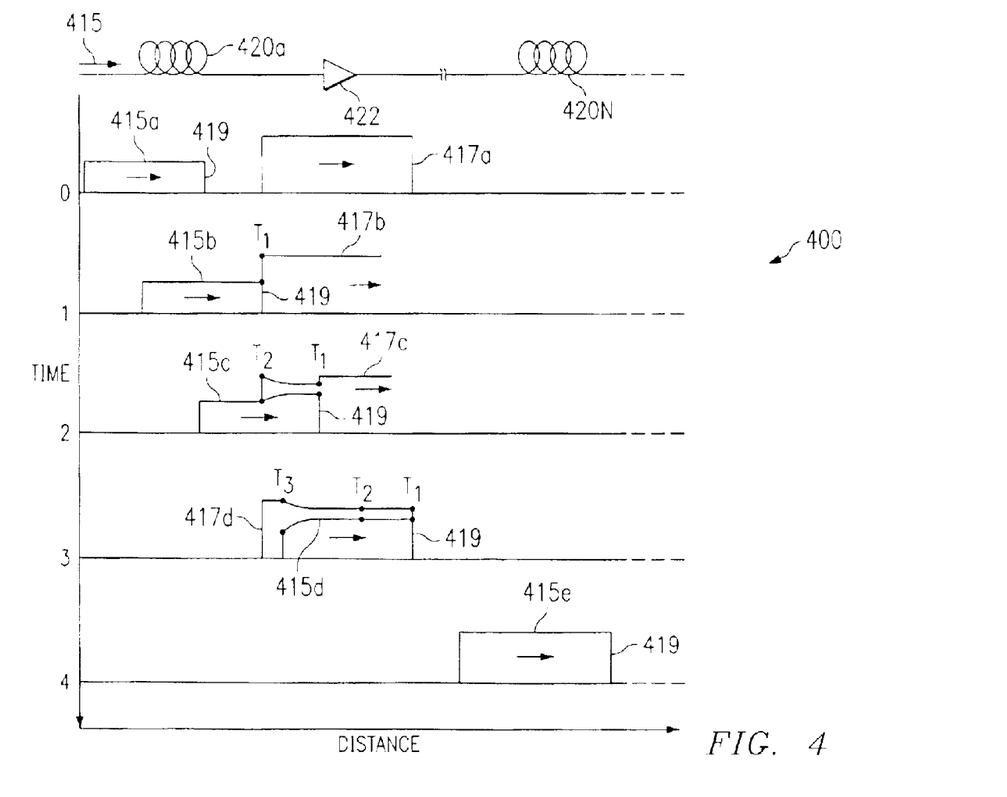
FIG. 4 is a graph showing one method of reducing the leading edge transient of an optical signal traversing an optical communication system.

FIG. 4 is a graph showing one method of reducing the leading edge transient of an optical signal traversing an optical communication system 400. In this example, communication system 400 includes an amplifier 422 implementing at least one co-propagating pump signal 417. Although this example shows one amplifier 422, any number of additional amplifiers could be used without departing from the scope of the present disclosure. In this example, amplifier 422 is operable to amplify optical signal 415 received from communication medium 420. In some embodiments, amplifier 422 comprises an amplifier having a relatively rapid response time, such as, for example, one (1) millisecond, one (1) microsecond, or less. In some embodiments, amplifier 422 comprises a relatively low RIN, such as −110 dBr, −120 dBr, −140 dBr, −150 dbr, or less. The structure and function of amplifier 422 can be substantially similar to amplifier 22 of FIG. 1.

In this example, line 415a represents optical signal 415 as it traverses a span 420a of system 400. In this example, signal 415 comprises a packet of information traversing system 400 which trails a preceding packet by sufficient time to allow amplifier 422 to recover from saturation due to interaction with the previous packet. In other embodiments, signal 415 could represent an optical signal introduced to system 400 upon start up. Line 415a is not intended to indicate the actual size of the packet, it is merely used for illustrative purposes. In this example, line 417a represents the gain profile of pump signal 417 traversing the gain medium of amplifier 422. Pump signal 417 initially comprises a non-saturated co-propagating pump signal that traverses the gain medium of amplifier 422 at approximately the same speed as optical signal 415. In some embodiments, optical signal 415 can traverse the gain medium of amplifier 422 with an optical slip of no more than two hundred (200) nanoseconds, no more than one hundred (100) nanoseconds, no more than (20) nanoseconds, or less. Detrimental effects resulting from the optical slip can be particularly acute in fibers having a positive slope of dispersion.

In this example, line 415b represents optical signal 415 as the signal begins ($T_1$) to interface with co-propagating pump signal 417. Line 417b represents the gain profile of pump signal 417 traversing the gain medium of amplifier 422. A leading edge 419 of signal 415 begins to interact with non-saturated pump signal 417. In this example, both optical signal 415 and pump signal 417 travel at approximately the same speed. As leading edge 419 continues to traverse the gain medium of amplifier 422, it continues to interact with substantially the same portion of pump signal 417 causing that portion of pump signal 417 to at least partially saturate.

In this example, line 417c represents the gain profile of pump signal 417 after leading edge 419 has partially traversed ($T_2$) the gain medium of amplifier 422. Line 415c represents optical signal 415 after optical signal 415 has partially traversed ($T_2$) amplifier 422. As leading edge 419 traversed the gain medium associated with amplifier 422, it depleted substantially the same portion of pump signal 417 that it initially encountered during time $T_1$. In other words, unlike leading edge 319 of FIG. 3, leading edge 419 does not continually interact with a new non-saturated portion of pump signal 419 as it traverses the gain medium of amplifier 422. Because pump signal 417 and optical signal 415 are traveling in substantially the same direction and at approximately the same speed, each portion of optical signal 415 following leading edge 419 will initially interact with a substantially non-saturated pump signal.

In this example, line 415d represents optical signal 415 after leading edge 419 has fully traversed the gain medium associated with amplifier 422, while line 415e represents optical signal 415 after optical signal 415 has fully traversed the gain medium of amplifier 422. Line 417d represents the gain profile of pump signal 417 after leading edge 419 has fully traversed the gain medium of amplifier 422. In this example, the size of lines 415d and 417d are not intended to indicate the actual or relative size of the packet or relative gain of the pump signal, they are merely used for illustrative purposes. As shown in this figure, each portion of optical signal 415 initially interacts with a substantially new portion of pump signal 417. This interaction typically results in a substantially uniform gain transfer across the entire optical signal. That is, the gain accepted by the portion of optical signal 415 trailing leading edge 419 is substantially similar to the gain accepted by leading edge 419. In addition, because leading edge 419 quickly saturates the portion of pump signal 417 co-propagating with leading edge 419, leading edge 419 does not continually see new unsaturated light and does not produce a large transient spike.

Figure 5:
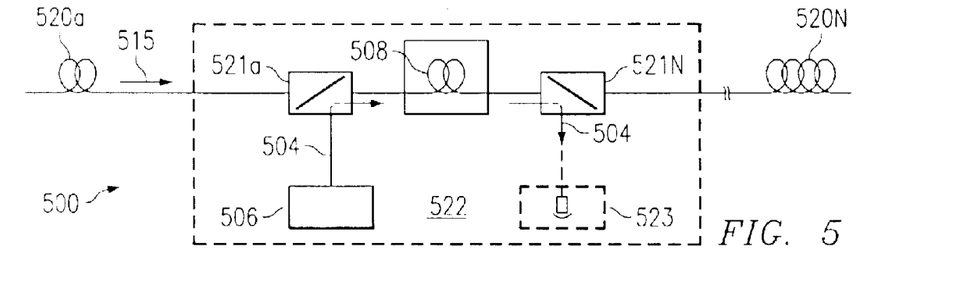
FIG. 5 is a block diagram showing a portion of an optical communication system implementing at least one amplifier generating a co-propagating pump signal.

FIG. 5 is a block diagram showing a portion of an optical communication system 500 implementing at least one amplification stage 522 generating at least one co-propagating pump signal 504. In this example, system 500 comprises a single amplification stage 522 coupled between span 520a and span 520b, and operable to amplify optical signal 515 received from span 520a. Although this example shows one amplification stage 522, any number of additional stages could be used without departing from the scope of the present disclosure. Amplification stage 522 could comprise a distributed Raman amplification stage, a discrete Raman amplification stage, a parametric amplification stage, or another amplifier type. In one particular embodiment, amplification stage 522 comprises a relatively low RIN, such as, for example, a RIN of −120 dBr.

In this example, amplification stage 522 includes a gain medium 508. Depending on the type of amplifier being implemented, gain medium 508 may comprise, for example, a gain fiber or a transmission fiber. In some embodiments, gain medium 508 comprises a length two hundred (200) meters. In one particular embodiment, gain medium 508 could comprise a length of dispersion compensating fiber serving as the gain medium within amplification stage 522. In various embodiments, the dispersion compensating fiber can have a magnitude of dispersion of at least ten (10) pico-seconds per nanometer-kilometer (ps/nm-km), at least fifty (50) ps/nm-km, at least one hundred (100) ps/nm-km, or more.

Amplification stage 522 further includes a wavelength pump 506 operable to generate pump signal 504 at a specified wavelength, which is pumped into gain medium 508. In one embodiment, pump 506 comprises a single optical source capable of generating all of the wavelengths contained within pump signal 504. In another embodiment, pump 506 comprises a plurality of optical sources each capable of generating at least one wavelength contained within optical signal 504.

In this example, pump signal 504 propagates through gain medium 508 in the same direction and at approximately the same speed as optical signal 515. Co-propagating pump signal 504 can comprise a single wavelength of light or a combination of a plurality of wavelengths of light. In one particular embodiment, at least one wavelength contained within pump signal 504 comprises a pair of approximately orthogonally polarized polarization multiplexed pump signals. Using a pair of approximately orthogonally polarized polarization multiplexed signals is advantageous in reducing the polarization dependence of the optical source. In addition, using a pair of approximately orthogonally polarized polarization pump signals enables the formation of higher-powered pump signals while using relatively lower powered pump sources.

Amplification stage 522 further includes a first coupler 521a operable to couple pump signal 504 to gain medium 508. Coupler 521a could comprise, for example, a wavelength division multiplexer or an optical coupler. In this example, amplification stage 522 also includes a second coupler 521n operable to decouple pump signal 504 from gain medium 508 after traversing the gain medium. Coupler 521n could comprise, for example, a wavelength division demultiplexer or an optical decoupler. In one particular embodiment, coupler 521n is also operable to couple a counter-propagating pump signal to gain medium 508. In that embodiment, amplification stage 522 could include a counter-propagating pump 523 operable to launch the counter-propagating pump signal, which is pumped into gain medium 508. In other embodiments, a counter-propagating pump signal can be generated from co-propagating pump signal 504. For example, a mirror assembly 523 could be used to reflect pump signal 504 back through gain medium 508 as a counter propagating pump signal.

Introducing at least one co-propagating pump signal to gain medium 508 substantially reduces the leading edge transient, even where counter-propagating pump signals are also used. In some embodiments, the optical signal exiting amplification stage 522 comprises a leading edge transient of no more than no more than ten (10) times the average power of optical signal 515 exiting amplification stage 522, and in some cases no more than five (5) times, no more than two (2) times, no more than one and one-tenth (1.1) times, no more than one and one-hundredth (1.01) times, or less.

Figure 6:
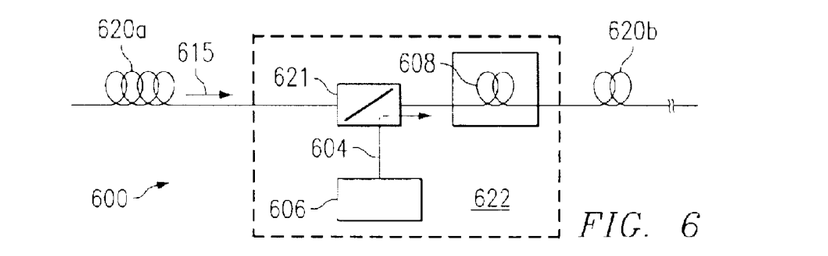
FIG. 6 is a block diagram of an optical communication system implementing at least one co-propagating amplifier.

FIG. 6 is a block diagram of another example of an amplifier assembly 600 implementing at least one co-propagating pump signal. In this example, amplification stage assembly 600 includes at least one amplification stage 622 coupled between span 620a and span 620b of an optical communication link 620. Amplification stage 622 is operable to amplify a multiple wavelength signal 616 received from span 620a. In this example, amplification stage 622 implements at least one co-propagating pump signal 604 that travels at approximately the same speed as a multiple wavelength optical signal 616. The structure and function of amplification stage 622 can be substantially similar to amplification stage 22 of FIG. 1. In one particular embodiment, amplification stage 622 comprises a relatively low RIN, such as, for example, a RIN of −120 dBr.

In this example, amplification stage 622 includes a gain medium 608. Depending on the type of amplification stage being implemented, gain medium 608 may comprise, for example, a gain fiber or a transmission fiber. In some embodiments, gain medium 608 comprises a length two hundred (200) meters. In one particular embodiment, gain medium 608 comprises a length of dispersion compensating transmission fiber serving as the gain medium within amplification stage 622. Other fiber types could, however, be used without departing from the scope of the present disclosure. In various embodiments, the is dispersion compensating fiber can have a magnitude of dispersion of at least ten (10) pico-seconds per nanometer-kilometer (ps/nm-km), at least fifty (50) ps/nm-km, at least one hundred (100) ps/nm-km, or more.

Amplification stage 622 further includes a wavelength pump 606 operable to generate co-propagating pump signal 604. The structure and function of pump 606 can be substantially similar to pump 506 of FIG. 5. In this example, amplification stage 622 also includes a coupler 621 operable to couple pump signal 604 to gain medium 608. Co-propagating pump signal 604 traverses gain medium 608 at approximately the same speed as optical signal 616. Pump signal 604 can be substantially similar to pump signal 504 of FIG. 5.

In this particular embodiment, co-propagating pump signal 604 continues to travel with optical signal 616 through at least a portion of span 620b of communications medium 620. Pump signal 604 continues to interact with optical signal 616 by leakage of pump signal 604 into the transmission fiber of span 620b. Allowing a co-propagating pump signal 604 to leak into transmission fiber 620b enhances the gain associated with optical signal 616, while minimizing the leading edge transient. Similar results to those describe in FIG. 5 can be obtained.

In one particular embodiment, amplification stage 622 comprises one stage in a multiple stage amplifier. In that embodiment, amplification stage 622 could comprise, for example, a distributed Raman amplification stage, where transmission fiber 620b comprises at least a portion of the gain medium. Amplification stage 622 could be coupled to one or more additional stages of a multiple stage amplifier. In one particular embodiment, the multiple stage amplifier comprises a first stage substantially similar to amplification stage 622 and a second stage substantially similar to amplification stage 522 of FIG. 5. Other combinations with other amplification stage types could alternatively be used.

Figure 7A:
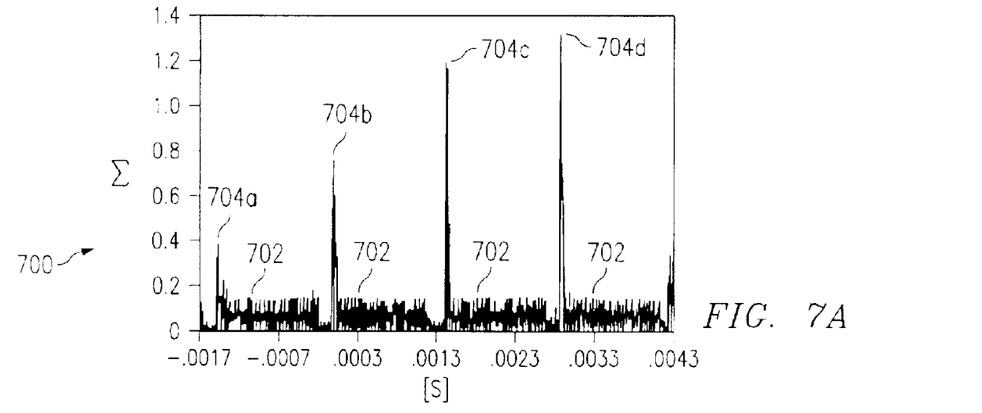
FIG. 7 is a graph comparing a counter-propagating amplified system with a co-propagating amplified system.
Figure 7B:
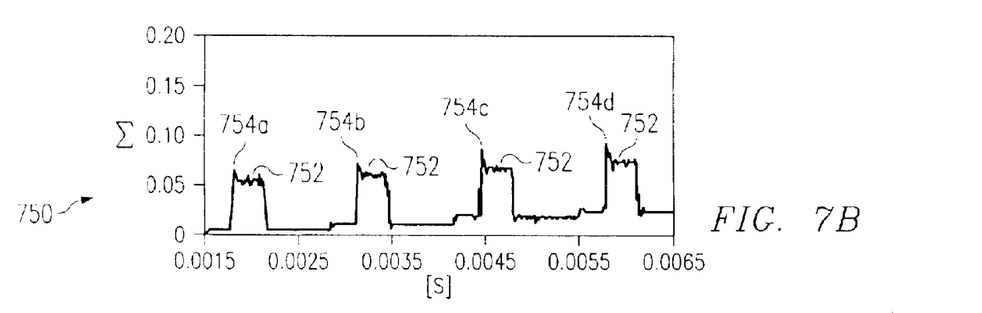

FIG. 7 is a graph showing experimental results of a counter-propagating amplified system 700 and a bi-directionally pumped co-propagating amplified system 750. In this example, system 700 includes three spans of communication link, each span comprising eighty (80) kilometers, with an exclusively counter-propagating amplifier coupled to the end of each span. The output of the final amplifier is coupled to the first span of the communication link to enable an optical signal 702 to be looped through system 700 four (4) times. A switch is placed between the output of the last amplifier and the input of the first span to ensure that the amplifiers have enough time to recover from saturation before the signal is re-introduced for another pass. In this example, the horizontal axis represents time and the vertical axis represents the magnitude of power of optical signal 702.

In this example, line 704a represents the power of the leading edge of optical signal 702 after signal 702 has completed one (1) loop through system 700. Line 704d represents the power of the leading edge of optical signal 702 after signal 702 has completed four (4) loops through system 700. This graph shows that each time signal 702 loops through system 700 the magnitude of the power spike of leading edge 704 substantially increases. This increase in magnitude of the power spike associated with leading edge 704 typically results in a poor optical noise figure of optical signal 702. In addition, this power spike could result in damage to a receiver coupled to system 700.

System 750 shown in FIG. 7 includes twelve (12) spans of communications link with a co-propagating amplifier coupled at the end of each span. In this case, the amplifiers coupled at the end of each span were pumps with a co-propagating pump signal that was reflected back through the gain medium after traversing the gain medium as a co-propagating signal. The resulting system approximates a bi-directionally pumped amplifier. Each amplifier was substantially similar to the embodiment shown in FIG. 5.

The output of the final amplifier is coupled to the first span of the communications link to enable an optical signal 752 to be looped through system 750 four (4) times. A switch is placed between the output of the last amplifier and the input of the first span to ensure that the amplifiers have enough time to recover from saturation before the signal is re-introduced for another pass. In this example, the horizontal axis represents time and the vertical axis represents the magnitude of power associated with optical signal 752.

The amplifiers of system 750 generate pump signals that traverse the gain medium of the respective amplifier at approximately the same speed as the optical signal. In addition, each amplifier comprises an amplifier that operates in saturation at least part of the time, and has a relatively rapid response time from the saturation condition to the non-saturated condition. In this particular example, each amplifier has a saturation recovery time of less than one (1) millisecond.

In this example, each amplifier in system 750 implements a gain fiber that is relatively dispersive and implements a pump having a relatively low RIN. The amount of pump noise transferred to an optical signal depends, at least in part, on the RIN associated with the pump of the amplifier. Using a highly dispersive fiber as the gain medium of the amplifier can reduce the amount of pump noise transferred from the pump signal. Depending on the desired performance specifications, an appropriate balance can be struck between the RIN of the pump and the dispersivity of the fiber. In this particular embodiment, for example, each amplifier comprises a pump with a RIN of −120 dBr and a gain fiber with a dispersion of −80 ps/nm-km. Other pump RIN values and gain fiber dispersivity could be used as a matter of design choice.

In this embodiment, line 754a represents the power spike of the leading edge of optical signal 752 after signal 752 has completed one (1) loop through system 750. Line 754d represents the greatly reduced power spike of the leading edge of optical signal 752 after signal 752 has completed four (4) loops through system 650. This graph shows that the magnitude of the power spike associated with optical signal 752 is substantially less than the magnitude of the power spike of optical signal 702. This reduction in the power spike occurs, even with optical signal 752 being amplified by approximately thirty-six (36) more amplifiers than optical signal 702.

In an optical system substantially similar to system 750, except for the use of the reflective mirror assembly, the peak power of the leading edge associated with optical signal 752 could be further reduced, and in some cases could equal the power level of the rest of optical signal 752. That is, a system that implements only co-propagating pump signals traveling at approximately the same speed as the optical signal may introduce virtually no leading edge transient to the optical signal.

As can be seen from this figure, the implementation of at least one co-propagating pump signal in one or more amplifiers of an optical communication system can substantially reduce the leading edge transient. In addition, the implementation of amplifiers using at least one co-propagating pump signal can result in a substantially improved optical noise figure compared to a system implementing exclusively counter-propagating amplifiers. This substantially improved optical noise figure at least partially compensates for the increased noise introduced by the longer interaction between the pump signal and the optical signal. In some embodiments, implementing exclusively co-propagating pump signals in an optical communication system can virtually eliminate the effects of the leading edge transient. In addition, the overall performance of amplifiers implementing one or more co-propagating pump signals can be equivalent to or even better than that of amplifiers implementing exclusively counter-propagating pump signals.

Figure 8:
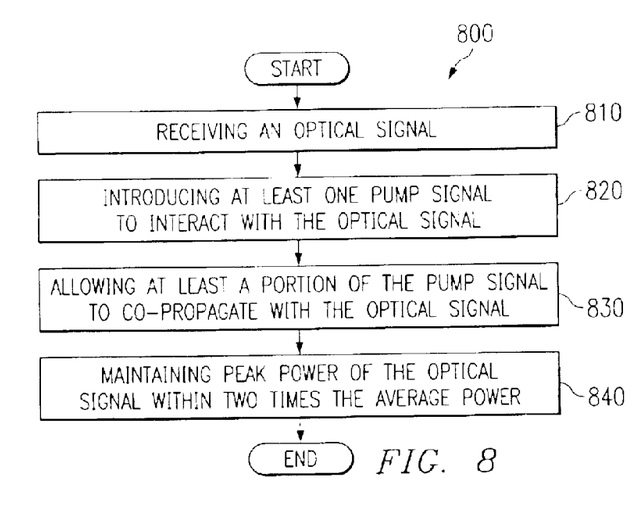
FIG. 8 is a flow chart showing one example of a method of reducing a leading edge transient associated with an optical signal.

FIG. 8 is a flow chart showing one example of a method 800 of reducing a leading edge transient associated with an optical signal being communicated. In one particular embodiment, the leading edge transient may be reduced in accordance with the embodiment depicted in FIG. 5. In this example, method 800 begins at step 810 where amplification stage 522 receives optical signal 515. In this example, optical signal 515 comprises a leading edge, which is the initial part of the signal interfacing with amplifier stage 522. In some embodiments, optical signal 515 could comprise a multiple wavelength signal.

In this embodiment, amplification stage 522 generates at least one co-propagating pump signal 504. In one particular embodiment, amplifier stage 522 could comprise a relatively low RIN, such as –120 dBr. In this example, amplification stage 522 comprises a Raman amplification stage. Amplification stage 522 could, however, comprise any amplifier type having a relatively rapid saturation recovery time. Parametric amplification stage and a semi-conductor amplification stages provide additional examples.

In this example, the saturation recovery time comprises a time period less than the time period between the leading edge of the optical signal received by the amplification stage and a trailing edge of an optical signal received just prior to the optical signal. For example, a saturation recover time of one (1) millisecond or less. This could result, for example, from amplification stage 522 experiencing a recent turn-on of signal power, or from amplification stage 522 receiving bursty traffic, such as packet or cell based traffic.

At least one pump signal 504 is introduced to gain medium 508 at step 820 to interact with optical signal 515. At least one of pump signals 504 comprises a pump signal that co-propagates with signal 515 in at least a portion of gain medium 508. Others of pump signals 504 may comprise additional co-propagating pump signals and/or counter propagating pump signals. Co-propagating pump signal 504 and optical signal 515 interact while traversing at least a portion of gain medium 508 in the same direction.

At least a portion of pump signal 504 is allowed to co-propagate with optical signal 515 at step 830 through at least a portion of gain medium 508. In one particular embodiment, optical signal 515 and pump signal 504 travel at approximately the same speed through at least a portion of gain medium 508. In some embodiments, optical signal 515 can comprise, for example, an optical signal slip of no more than two hundred (200) nanoseconds.

The peak power of the leading edge of optical signal 515 is maintained at step 840 to within ten (10), times the average power of optical signal 515. In various embodiments, the leading edge comprises a peak power of no more than one and one-tenth (1.1) times the average power of optical signal 515 received by amplification stage 522.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An optical amplifier comprising at least one amplification stage having a saturation recovery time of less than one (1) millisecond, the amplification stage comprising:
 a gain medium operable to receive at least one pump signal and to receive from a multiple span communication link an optical signal comprising a leading edge, wherein the at least one pump signal and the optical signal travel in the same direction at approximately the same speed through at least a portion of the gain medium; and
 wherein the leading edge of the optical signal after passing through a plurality of amplifiers when received by a receiver coupled to the communication link comprises a peak power that is no more than ten (10) times the average power of the optical signal at the receiver.

2. The amplifier of claim 1, wherein the amplifier operates during amplification in at least five percent (5%) saturation.

3. The amplifier of claim 1, wherein the amplifier operates during amplification in at least ten percent (10%) saturation.

4. The amplifier of claim 1, wherein the amplifier operates during amplification in at least twenty percent (20%) saturation.

5. The amplifier of claim 1, wherein the gain medium comprises a dispersion compensating fiber.

6. The amplifier of claim 5, wherein the dispersion compensating fiber has a magnitude of dispersion of at least ten (10) pico-seconds per nanometer-kilometer.

7. The amplifier of claim 5, wherein the dispersion compensating fiber has a magnitude of dispersion of at least fifty (50) pico-seconds per nanometer-kilometer.

8. The amplifier of claim 5, wherein the dispersion compensating fiber has a magnitude of dispersion of at least one hundred (100) pico-seconds per nanometer-kilometer.

9. The amplifier of claim 1, wherein the gain medium comprises at least a portion of a transmission fiber.

10. The amplifier of claim 1, wherein the optical signal comprises a multiple wavelength signal.

11. The amplifier of claim 1, wherein an optical signal slip between the optical signal and the at least one pump signal comprises no more than two hundred (200) nanoseconds.

12. The amplifier of claim 1, wherein an optical signal slip between the optical signal and the at least one pump signal comprises no more than one hundred (100) nanoseconds.

13. The amplifier of claim 1, wherein an optical signal slip between the optical signal and the at least one pump signal comprises no more than twenty (20) nanoseconds.

14. The amplifier of claim 1, wherein the optical signal and the at least one pump signal travel through the at least a portion of the gain medium in substantially opposite directions.

15. The amplifier of claim 1, wherein the optical signal and another pump signal travel through the at least a portion of the gain medium in substantially opposite directions.

16. The amplifier of claim 1, wherein the leading edge comprises a peak power of no more than five (5) times the average power of the optical signal received by the receiver.

17. The amplifier of claim 1, wherein the leading edge comprises a peak power of no more than two (2) times the average power of the optical signal received by the receiver.

18. The amplifier of claim 1, wherein the leading edge comprises a peak power of no more than one and one-tenth (1.1) times the average power of the optical signal received by the receiver.

19. The amplifier of claim 1, wherein the leading edge comprises a peak power of no more than one and five-hundredths (1.05) times the average power of the optical signal received by the receiver.

20. The amplifier of claim 1, wherein the amplifier maintains the peak power to no more than ten (10) times the average power of the optical signal, even where a saturation recovery time of the amplifier is less than a time period between the leading edge of the optical signal received by the amplifier and a trailing edge of an optical signal received just prior to the optical signal.

21. The amplifier of claim 1, wherein the amplifier comprises an amplification stage selected from a group consisting of a Raman amplification stage, a Parametric amplification stage, and a Semiconductor amplification stage.

22. The amplifier of claim 21, wherein the amplifier comprises a multiple stage amplifier, wherein at least one stage comprises rare earth doped amplification stage.

23. The amplifier of claim 1, wherein the at least one pump signal comprises a plurality of individual pump signals.

24. The amplifier of claim 23, wherein at least one of the plurality of individual pump signals is generated by a separate wavelength pump.

25. The amplifier of claim 23, wherein at least one of the plurality of individual pump signals comprises a pair of approximately orthogonally polarized polarization pump signals.

26. The amplifier of claim 1, wherein the optical signal comprises a packet.

27. The amplifier of claim 1, wherein the multiple span communication link comprises five (5) spans.

28. The amplifier of claim 1, wherein the multiple span communication link comprises seven (7) spans.

29. The amplifier of claim 1, wherein the multiple span communication link comprises ten (10) spans.

30. The amplifier of claim 1, wherein the amplification stage has a saturation recovery time of less than one (1) microsecond.

31. The amplifier of claim 1, wherein the at least one pump signal comprises an amplifier with a relatively low RIN.

32. The amplifier of claim 1, wherein the at least one pump signal comprises a RIN of −120 dBr or less.

33. An optical amplifier operable to be coupled to a multiple span communication link, the amplifier comprising:

a gain medium operable to receive at least one pump signal and an optical signal comprising a leading edge, wherein the at least one pump signal and the optical signal interact while traveling through at least a portion of the gain medium in the same direction;

wherein the leading edge of the optical signal when received by a receiver coupled to an end of the communication link comprises a peak power that is no more than ten (10) times the average power of the optical signal received, even where a saturation recovery time of the amplifier is less than a time period between the leading edge of the optical signal received by the amplifier and a trailing edge of an optical signal received just prior to the optical signal.

34. The amplifier of claim 33, wherein the amplifier operates during amplification in at least five percent (5%) saturation.

35. The amplifier of claim 33, wherein the gain medium comprises a dispersion compensating fiber.

36. The amplifier of claim 35, wherein the dispersion compensating fiber has a magnitude of dispersion of at least ten (10) pico-seconds per nanometer-kilometer.

37. The amplifier of claim 33, wherein the gain medium comprises at least a portion of a transmission fiber.

38. The amplifier of claim 33, wherein the optical signal comprises a multiple wavelength signal.

39. The amplifier of claim 33, wherein the pump signal and optical signal travel at approximately the same speed for at least a portion of gain medium.

40. The amplifier of claim 39, wherein an optical signal slip between the optical signal and the at least one pump signal comprises no more than two hundred (200) nanoseconds.

41. The amplifier of claim 33, wherein the amplifier has a saturation recovery time of less than one (1) millisecond.

42. The amplifier of claim 33, wherein the optical signal and the at least one pump signal travel through the at least a portion of the gain medium in substantially opposite directions.

43. The amplifier of claim 33, wherein the optical signal and another pump signal travel through the at least a portion of the gain medium in substantially opposite directions.

44. The amplifier of claim 33, wherein the leading edge comprises a peak power of no more than five (5) times the average power of the optical signal received by the receiver.

45. The amplifier of claim 33, wherein the leading edge comprises a peak power of no more than one and one-tenth (1.1) times the average power of the optical signal received by the receiver.

46. The amplifier of claim 33, wherein the amplifier comprises an amplification stage selected from a group consisting of a Raman amplification stage, a Parametric amplification stage, and a Semiconductor amplification stage.

47. The amplifier of claim 46, wherein the amplifier comprises a multiple stage amplifier, wherein at least one stage comprises rare earth doped amplification stage.

48. The amplifier of claim 33, wherein the at least one pump signal comprises a plurality of individual pump signals.

49. The amplifier of claim 48, wherein at least one of the plurality of individual pump signals is generated by a separate wavelength pump.

50. The amplifier of claim 33, wherein the optical signal comprises a packet.

51. The amplifier of claim 33, wherein the multiple span communication link comprises five (5) spans.

52. The amplifier of claim 33, further comprising a wavelength pump operable to generate the at least one pump signal.

53. The amplifier of claim 33, wherein the at least one pump signal comprises a relatively low RIN.

54. The amplifier of claim 33, wherein the at least one pump signal comprises a RIN of −120 dBr or less.

55. An optical amplifier comprising at least one amplification stage, the amplification stage comprising:

a gain medium comprising a length of at least two hundred (200) meters and operable to receive at least one pump signal and to receive from a multiple span communication link an optical signal comprising a leading edge, wherein the at least one pump signal and the optical signal travel in the same direction at approximately the same speed through at least a portion of the gain medium;

wherein the amplification stage comprises a Raman amplification stage; and wherein the at least one pump signal goes from a non-saturated operating state to an at least partially saturated operating state while the leading edge traverses the amplification stage to reduce an overshoot in gain imparted to the leading edge.

56. The amplifier of claim 55, wherein the amplification stage has a saturation recovery time of less than one (1) millisecond.

57. The amplifier of claim 55, wherein the gain medium comprises a dispersion compensating fiber.

58. The amplifier of claim 57, wherein the dispersion compensating fiber has a magnitude of dispersion of at least ten (10) pico-seconds per nanometer-kilometer.

59. The amplifier of claim 55, wherein the gain medium comprises at least a portion of a transmission fiber.

60. The amplifier of claim 55, wherein the optical signal comprises a multiple wavelength signal.

61. The amplifier of claim 55, wherein an optical signal slip between the optical signal and the at least one pump signal comprises no more than two hundred (200) nanoseconds.

62. The amplifier of claim 55, wherein the leading edge of the optical signal after passing through a plurality of amplifiers when received by a receiver coupled to the communication link comprises a peak power that is no more than ten (10) times the average power of the optical signal at the receiver.

63. The amplifier of claim 62, wherein the leading edge comprises a peak power of no more than five (5) times the average power of the optical signal received by the receiver.

64. The amplifier of claim 62, wherein the leading edge comprises a peak power of no more than one and one-tenth (1.1) times the average power of the optical signal received by the receiver.

65. The amplifier of claim 62, wherein the amplifier maintains the peak power to no more than ten (10) times the average power of the optical signal, even where a saturation recovery time of the amplifier is less than a time period between the leading edge of the optical signal received by the amplifier and a trailing edge of an optical signal received just prior to the optical signal.

66. The amplifier of claim 55, wherein the multiple span communication link comprises five (5) spans.

67. The amplifier of claim 55, wherein the at least one pump signal comprises an amplifier with a relatively low RIN.

68. A method of amplifying an optical signal in a multiple span communication link, the method comprising:

receiving an optical signal comprising a leading edge at a gain medium of an amplification stage having a saturation recovery time of less than one (1) millisecond; and introducing at least one pump signal to the gain medium to interact with the optical signal, wherein the optical signal and at least a portion of the at least one pump signal travel in the same direction and at approximately the same speed through at least a portion of the gain medium;

wherein the leading edge of the optical signal when received by a receiver coupled to the communication link after passing through a plurality of amplifiers comprises a peak power that is no more than ten (10) times the average power of the optical signal at the receiver.

69. The method of claim 68, wherein the optical signal comprises a multiple wavelength signal.

70. The method of claim 68, wherein the gain medium comprises a dispersion compensating fiber.

71. The method of claim 70, wherein the dispersion compensating fiber has a magnitude of dispersion of at least ten (10) pico-seconds per nanometer-kilometer.

72. The method of claim 68, wherein the gain medium comprises at least a portion of a transmission fiber.

73. The method of claim 68, wherein the amplification stage comprises an amplification stage selected from a group consisting of a Raman amplification stage, a Parametric amplification stage, and a Semiconductor amplification stage.

74. The method of claim 68, wherein introducing the at least one pump signal comprises a pump signal traveling opposite the optical signal through at least a portion of the gain medium.

75. The method of claim 68, wherein the rapid saturation recovery time comprises a time period less than the time period between the leading edge of the optical signal received by the amplification stage and a trailing edge of an optical signal received just prior to the optical signal.

76. The method of claim 68, wherein introducing the at least one pump signal comprises a pump signal traveling opposite the optical signal through at least a portion of the gain medium.

77. The method of claim 68, wherein an optical signal slip between the optical signal and the at least one pump signal comprises no more than two hundred (200) nanoseconds.

78. The method of claim 68, wherein the leading edge comprises a peak power of no more than five (5) times the average power of the optical signal received by the receiver.

79. The method of claim 68, wherein the leading edge comprises a peak power of no more than one and one-tenth (1.1) times the average power of the optical signal received by the receiver.

80. A method of amplifying an optical signal in a multiple span communication link, the method comprising:

receiving at a gain medium of an optical amplification stage an optical signal comprising a leading edge; and introducing at least one pump signal to the gain medium to interact with the optical signal, wherein the optical signal and at least a portion of the at least one pump signal travel through at least a portion of the gain medium in the same direction; and wherein the leading edge of the optical signal when received by a receiver coupled to an end of the communication link comprises a peak power that is no more than ten (10) times the average power of the optical signal received, even where a saturation recovery time of the amplifier is less than a time period between the leading edge of the optical signal received by the amplifier and a trailing edge of an optical signal received just prior to the optical signal.

81. The method of claim 80, wherein the optical signal comprises a multiple wavelength signal.

82. The method of claim 80, wherein the gain medium comprises a dispersion compensating fiber.

83. The method of claim 82, wherein the dispersion compensating fiber has a magnitude of dispersion of at least ten (10) pico-seconds per nanometer-kilometer.

84. The method of claim 80, wherein the gain medium comprises at least a portion of a transmission fiber.

85. The method of claim 80, wherein the amplification stage comprises an amplification stage selected from a group consisting of a Raman amplification stage, a Parametric amplification stage, and a Semiconductor amplification stage.

86. The method of claim 80, wherein introducing the at least one pump signal comprises a pump signal traveling opposite the optical signal through at least a portion of the gain medium.

87. The method of claim 80, wherein the pump signal and the optical signal travel at a approximately the same speed for at least a portion of the gain medium.

88. The method of claim 87, wherein an optical signal slip between the optical signal and the at least one pump signal comprises no more than two hundred (200) nanoseconds.

89. The method of claim 80, wherein the leading edge comprises a peak power of no more than five (5) times the average power of the optical signal received by the receiver.

90. The method of claim 80, wherein the leading edge comprises a peak power of no more than one and one-tenth (1.1) times the average power of the optical signal received by the receiver.

91. A method of amplifying an optical signal in a multiple span communication link, the method comprising:

receiving at a gain medium of an optical amplification stage an optical signal comprising a leading edge; and introducing at least one pump signal to the gain medium to interact with the optical signal, wherein the gain medium comprises a length of at least two hundred (200) meters, and wherein the optical signal and at least a portion of the at least one pump signal travel through at least a portion of the gain medium in the same direction;

wherein the amplification stage comprises a Raman amplification stage; and wherein the at least one pump signal goes from a non-saturated operating state to an at least partially saturated operating state while the leading edge traverses the amplification stage to reduce an overshoot in gain imparted to the leading edge of the optical signal.

92. The method of claim 91, wherein the optical signal comprises a multiple wavelength signal.

93. The method of claim 91, wherein the gain medium comprises a dispersion compensating fiber.

94. The method of claim 91, wherein the gain medium comprises at least a portion of a transmission fiber.

95. The method of claim 91, wherein introducing the at least one pump signal comprises a pump signal traveling opposite the optical signal through at least a portion of the gain medium.

96. The method of claim 91, wherein the pump signal and the optical signal travel at approximately the same speed for at least a portion of the gain medium.

97. The method of claim 96, wherein an optical signal slip between the optical signal and the at least one pump signal comprises no more than two hundred (200) nanoseconds.

98. The method of claim 91, wherein the leading edge of the optical signal after passing through a plurality of amplifiers when received by a receiver coupled to the communication link comprises a peak power that is no more than ten (10) times the average power of the optical signal at the receiver.

99. The method of claim 98, wherein the leading edge comprises a peak power of no more than five (5) times the average power of the optical signal received by the receiver.

100. The method of claim 98, wherein the leading edge comprises a peak power of no more than one and one-tenth (1.1) times the average power of the optical signal received by the receiver.

101. An optical amplifier comprising at least one amplification stage, the amplification stage comprising:

a gain medium operable to receive at least one pump signal and to receive from a multiple span communication link an optical signal comprising a leading edge, wherein the at least one pump signal and the optical signal travel in the same direction at approximately the same speed through at least a portion of the gain medium;

wherein the amplification stage comprises a Raman amplification stage; and wherein the leading edge of the optical signal substantially overlaps with a portion of the pump signal through at least a majority of the gain medium to reduce an overshoot in gain imparted to the leading edge by the at least one pump signal.

* * * * *